United States Patent [19]

Malcolm

[11] Patent Number: 4,541,844

[45] Date of Patent: Sep. 17, 1985

[54] METHOD AND APPARATUS FOR DIELECTROPHORETICALLY ENHANCED PARTICLE COLLECTION

[76] Inventor: David H. Malcolm, 18 Deer Run Dr., Randolph, N.J. 07869

[21] Appl. No.: 605,399

[22] Filed: Apr. 30, 1984

[51] Int. Cl.⁴ .............................................. B03C 3/16
[52] U.S. Cl. .......................................... 55/10; 55/107
[58] Field of Search ............................. 55/10, 107, 122

[56] References Cited

U.S. PATENT DOCUMENTS

| | | | |
|---|---|---|---|
| Re. 30,479 | 1/1981 | Cohen et al. | 55/10 |
| 2,525,347 | 10/1950 | Gilman | 55/10 |
| 3,016,979 | 1/1962 | Schmid | 55/10 |
| 3,520,662 | 7/1970 | Marks | 55/10 X |
| 3,729,898 | 5/1973 | Richardson | 55/10 X |
| 3,960,505 | 6/1976 | Marks | 55/122 X |
| 4,141,698 | 2/1979 | Kihlstedt et al. | 55/107 X |

Primary Examiner—Kathleen J. Prunner
Attorney, Agent, or Firm—Robert Isner

[57] ABSTRACT

Method and apparatus for the removal of particulate matter, fumes, mists and noxious gases from a gas stream utilizing selectively sized and electrically charged water droplets, preferably between 30 and 60 microns, that exhibit significantly enhanced affinity for smaller uncharged particles through dielectrophoretic attraction, said droplets being present in such relatively low concentration that performance is not limited by space charge. The charged droplets are caused to move relative to the gas stream by inertial or electrostatic means, or both, at such a velocity and path as to maximize encounters between charged droplets and the particles to be collected.

15 Claims, 8 Drawing Figures

METHOD AND APPARATUS FOR DIELECTROPHORETICALLY ENHANCED PARTICLE COLLECTION

This invention relates to a method and apparatus for the removal of small sized particles, fumes, mists and vapors from a gas stream by using selectively sized electrically charged droplets. Many systems and devices employing electrostatic forces have been proposed to remove particles from gas streams. Some of such systems have included the combined usage of electrostatic forces and water droplets but, for reasons pointed out herein, none have resulted in successful commercial operation.

The most common present day particle collection systems employing water droplets as a collection medium are low energy scrubbers such as spray towers and high energy scrubbers such as venturi scrubbers. Both operate by producing a spray of water droplets which move relative to the particle bearing gas stream and the particles therein are collected on the droplets by collision processes. In a common form of spray tower, water droplets in the size range of 500 to 1000 microns fall, under the influence of gravity, down within a vertical tower through which passes a counter current flow of particle laden gases. The water droplets collect the particles and are removed at the bottom of the tower. in contradistinction, the venturi scrubber operates by accelerating the particle laden gas stream to between 50 and 100 meters per second, and sometimes higher, in a narrow duct or venturi using high pressure blowers. Water droplets typically in the size range of 50 to 200 microns, are injected, usually transversely, at the throat of the venturi or near the upstream end of the duct and, until they are accelerated up to the stream velocity, the relatively high differential velocity between the water droplets and the particles in the gas stream results in a high collision rate and relatively efficient collection. The water droplets are subsquently collected in a cyclone or other collecting device. In general, spray towers are relatively inefficient whereas venturi scrubbers can be highly efficient. However, the efficiency of a venturi scrubber is generally proportional to the pressure drop in the system and such results in high energy costs for practical operation as compared to the low energy requirements of spray towers.

Numerous suggestions have been made which combine the use of electrostatic forces of water or liquid droplets for enhanced particle collection. British Pat. No. 5051 of Feb. 26, 1914 discloses a wet scrubber with counter current flows of negatively charged sprayed droplets and particle bearing gas stream in a vertical tube. The walls of the tube are charged positively. U.S. Pat. No. 1,958,406 discloses use of a ringshaped conductor to produce a fine spray of charged water droplets from a spray discharge nozzle. Similarly the U.S. Pat. No. 2,357,354 and 2,357,355 and the Marks U.S. Pat. No. 3,503,704 use a similar conductor to induce charge on the droplets, with all three systems relying upon the space charge field from the charged droplets to effect a collection of particles at the wall. A common characteristic of all the mechanisms and methods disclosed in the foregoing patents is the reliance upon the introduction of droplets at high velocity, whereupon their motion is controlled by the closely spaced induction charging electrodes resulting in low average relative velocity differences between the water droplets and the entrained particles and a lack of awareness of any need to limit space charge fields to levels where they do not impact the operation of the system, or of any need to limit the droplet size to the regime where dielectrophoretic forces have significant if not controlling effect. U.S. Pat. No. 3,958,959 discloses the use of a set of discharge nozzles at high voltage for spraying water droplets created and charged by electrohydrodynamic action, and collection at plates disposed parallel to said discharge nozzles. In such system however, the patent teaches the use of relatively large water droplets in the size range of 80 to 120 microns diameter charged close to the theoretical limits in order to attain high relative velocity between the water droplets and the gas stream containing the entrained particles. However, this patent shows no apparent awareness of nor gives any consideration to the practical limits of charging such particles nor to the resultant space charge fields, which operate to inhibit operation in all but the smallest sized systems. This patent further teaches supplying highly conducting fluids such as water to the supply jets at high voltage which poses severe practical difficulties. Other patents, typified by U.S. Pat. No. 2,525,347, disclose charging the entrained particles by an ionizing wire in the gas stream prior to interacting with accelerated charged water droplets produced by an induction ring electrode. However, the high velocities in the gas stream necessary to prevent liquid deposition on the ring electrode, operate to sverely restrict the relative velocity differential between the entrained particulates and the water droplets and thus essentially rely upon the attraction of unlike charges thereon for efficient collection therebetween.

This invention may be broadly described as an improved particle collection method and apparatus to produce and employ selectively sized and charged liquid droplets that exhibit significantly enhanced attraction and capture cross-section for smaller sized and uncharged particulates, borne in a gas stream, through dielectrophoretic action. In a somewhat narrower aspect the subject invention includes the production of water droplets of less than 60 microns in diameter bearing a charge of greater than $10^{-3}$ coulombs per kilogram having significantly enhanced attraction, through dielectrophoretic action, for neutral particles less than 20 microns in diameter. In a still further narrowed aspect, the invention includes the production of water droplets of about 30 to 60 microns in diameter bearing a charge in the range of $10^{-3}$ to $10^{-2}$ coulombs per kilogram that have significantly enhanced attraction, through dielectrophoretic action. for particles less than 20 microns in diameter and which may be readily collected in cyclone type sperators, and which minimizes the undesireable performance impairing space charge effects that have generally characterized prior proposed charged liquid droplet particle collection systems.

The primary object of this invention is the provision of improved particle collection methods and apparatus for producing and employing selectively sized and charged liquid droplets that exhibit significantly enhanced attraction and capture cross section for smaller sized uncharged particulates borne in a gas stream, by dielectrophoretic action.

Another object of the invention is the provision of improved method and apparatus to produce and employ water droplets of less than 60 microns in diameter bearing a charge of greater than $10^{-3}$ coulombs per kilogram having significantly enhanced attraction, through dielectrophoretic action, for neutral particles of less than 20 microns in diameter, for particle collection.

Another object of this invention is to provide a means of efficiently removing particulates of between 0.1 and 20 microns in diameter by dielectrophoretically enhanced collision with selectively sized charged water droplets through utilization of a ratio of water volume to volume of gas treated of less than 1 in 10,000.

Apparatus incorporating the principles of this invention can be in the form of a low energy embodiment in a general nature of a selectively constructed spray tower or in the form of a higher energy embodiment in the general nature of a selectively constructed venturi type scrubber.

In the higher energy embodiments the gas stream cotaining the entrained particles, fume or mist, is passed through a duct, preferably circular in cross section, and which is constricted in diameter for a length of several meters in a configuration generally similar to venturi scrubber. The gas stream is accelerated in the venturi section to a velocity of approximately 30 to 60 meters per second. Downstream of the venturi section, the duct expands gradually to provide a reduction in the flow velocity and in such manner that minimum overall pressure drop is obtained. Immediately in advance of the upstream end of constricted or venturi portions of the duct and in disposed spaced relation thereto, is a generally cylindrical charging electrode having its downstream end of spherical or curved contour. The electrode is selectively located close to the venturi entrance so that the cross section area of gas flow around it is greater than that of the immediately downstream venturi section of the duct. The electrode is appropriately insulated from the duct by convoluted high voltage insulating means, and is connected to one pole of high voltage DC power supply that is adjusted to provide an output voltage in the range of 20 to 100 kilovolts, depending upon the size of the system. A liquid, usually water, radially into the throat of the venturi portion through multiple spraying heads or other spraying means circumferentially disposed around the duct and immediately downstream of the charging electrode. A preferred means are flat fan nozzles having the plane of the spray pattern disposed normal to the axis of the duct. Alternatively however, electrohydrodynamic capillary means as disclosed in U.S. Pat. No. 3,958,959 or piezo-electric ultrasonic nozzles of type similar to those produced by Sono-Tek Corporation of Poughkeepie, NY may also be used to provide the liquid spray. The spray nozzles are adjusted to produce discrete liquid droplets of between 30 and 60 microns in diameter and preferably in a size range of between 40 and 50 microns in diameter in the operating enviroment. Volume flow rate of water through the nozzles will be controlled to be in the range of $10^{-5}$ to $10^{-4}$ of the volume flow rate of the gas to be cleaned. The electrical potential on the charging electrode, which may be either positive or negative, is maintained at such level that the droplets are charged to desirable level of between $10^{-3}$ and $10^{-2}$ coulombs per kilogram and the axial speed of the gas down the duct is maintained sufficiently high to prevent charged liquid droplets from being drawn to the charging electrode. As will be later pointed out in greater detail, liquid droplets of this size and charge level exhibit a greatly enhanced affinity for the collection of uncharged droplets of smaller size and operate to effectively collect said smaller particles. It also appears that, in addition to substantially increasing the collection efficiency of individual droplets, the attractive forces extant between the charging electrode at high potential and the opposite charge induced on the introduced liquid droplets operates to retard the acceleration of liquid droplets in the gas stream, thus effecting an increase in the differential approach velocity between the droplets and the entrained particles and to thus further enhance the opportunity for collisions therebetween. After deceleration of the gas flow in the downstream portion of the expanding duct, the droplets may readily be collected in a cyclone seperator or the like.

In the low energy embodiments of this invention, the gas containing the entrained particles, fumes or mist is passed vertically through an annulus formed by two concentric conducting cylinders, the outer of which is maintained at ground potential and the inner one of which is maintained at high electrical potential, typically between 20 and 100 kilovolts and sometimes higher. In this embodiment water is sprayed radially inwards from the outer grounded cylinder by suitable atomizing jets, nozzles or the like. Such droplets are charged, simultaneously with the formation thereof, by induction charging under the influence of the electric field between the central conducting cylinder and the grounded outer cylinder. The nozzles, which are again preferably flat fan nozzles with the plane of atomization disposed normal to the direction of gas flow, are uniformally disposed circumferentially and vertically around the inner wall of the outer cylinder. The charged water droplets move transversely across the gas flow in a radially inward direction, toweard and to the central conductor, under the influence of the electric field between the two cylinders. The water flow rates, droplet size and charge levels are desirably similar to those described immediately heretofore with respect to the high energy embodiment of this invention. The magnitude of the electric field between the inner and outer defining walls of the annulus is desirably between $10^5$ and $10^6$ volts per meter. Under the influence of an electric field of $5\times10^5$ volts per meter, a 40 micron diameter water droplet, charged at a level of $4\times10^{-3}$ coulombs per kilogram, will traverse the annulus at a velocity of about 20 meters per second. As in the above described high energy embodiment of this invention, the considerably enhanced affinity for smaller uncharged particles exhibited by water droplets of this size and charge level and moving at relative speeds of this magnitude results in highly efficient particle collision and collection. The water droplets containing the captured particles flow downward on the cylindrical surface of the inner conductor under the influence of gravitational forces and, if suitably uniformly distributed around the inner cylindrical wall, can be causeed to break up under the influence of the electrical field between the inner conductor at high electrical potential and a grounded conducting reservoir disposed in spaced relation around and beneath the lower end of said inner conductor, thus providing effective electrical isolation between the two, all as more fully described hereinafter.

In either the high or low energy embodiments of this invention, the water droplets may contain a suitable chemical agent to react with the undesirable vaporous components of the gas stream, such reaction being enhanced by the large surface to volume ratio associated with small particles and by the enhanced diffusion which takes place in the boundary layer of charged droplets.

Other objects and advantages of the subject invention will be pointed out in the specification and claims and will be apparent from the drawings which disclose, in accord with the mandate of the patent statutes, presently preferred embodiments that incorporate the principles of the invention.

REFERRING TO THE DRAWINGS

Figure 1:
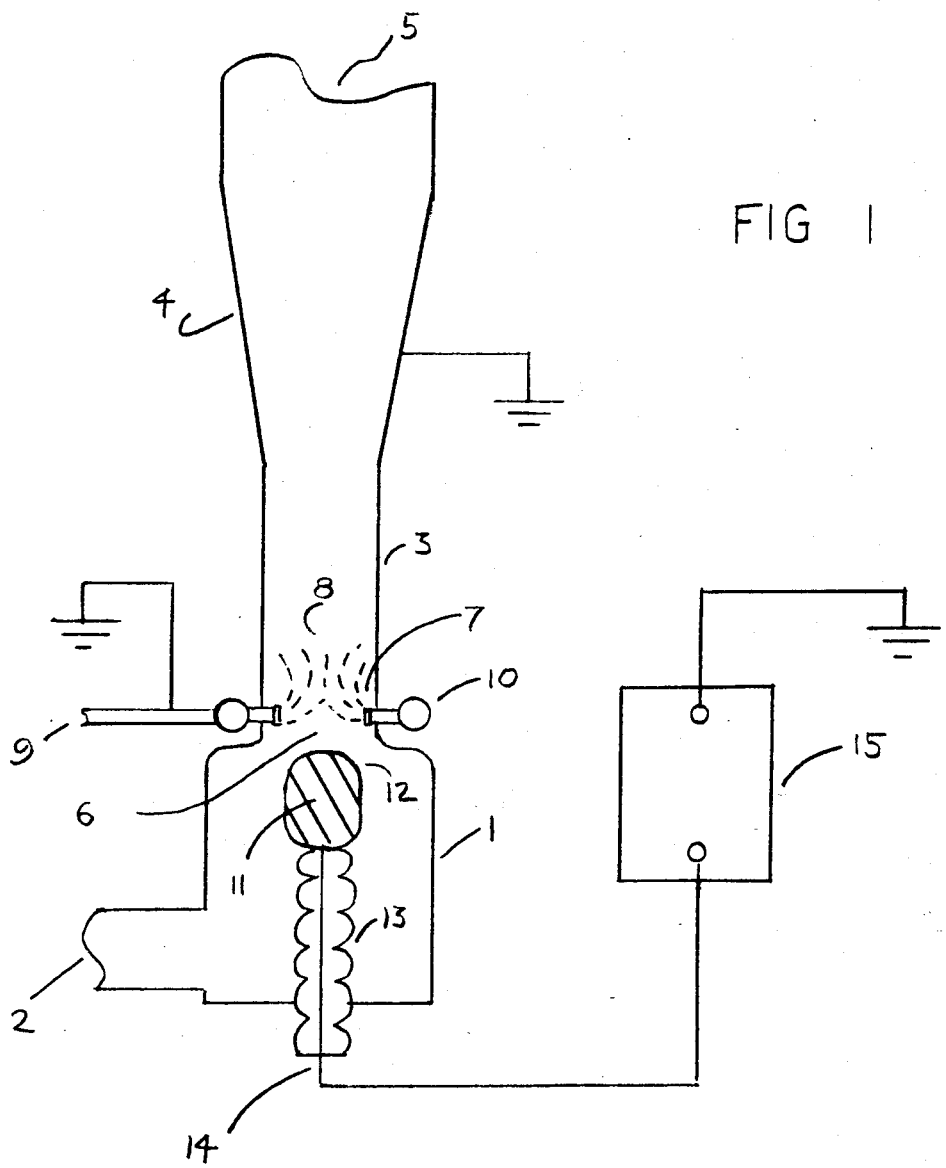
FIG. 1 is a schematic side elevational view of the venturi section of a high energy type of charged droplet scrubber incorporating the principles of this invention.
Figure 2:
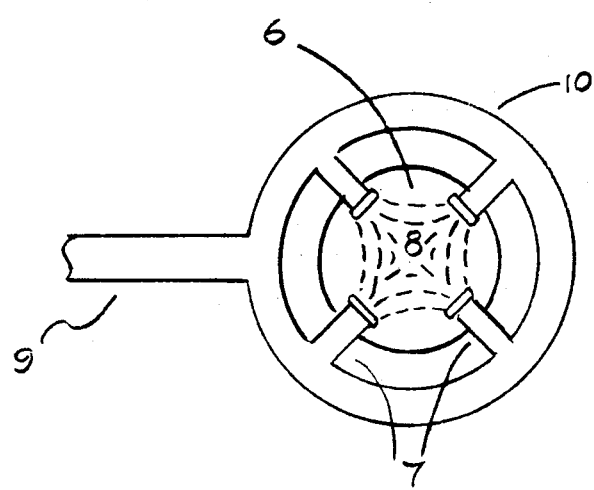
FIG. 2 shows a suitable arrangement of radially directed spray nozzles at the throat of the venturi section of the device shown in FIG. 1.
Figure 3:
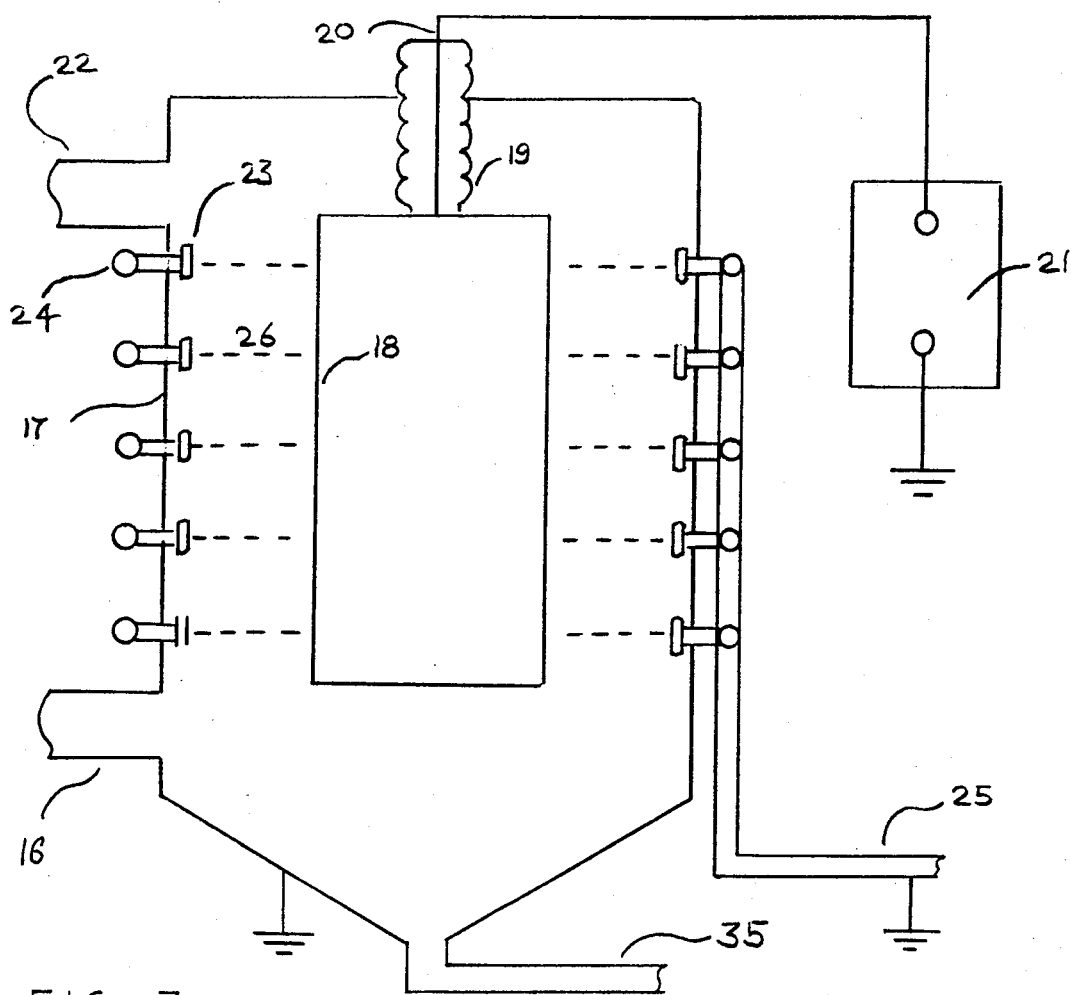
FIG. 3 is a schematic side elevational view of a low energy type of charged droplet scrubber incorporating the principles of this invention.
Figure 4:
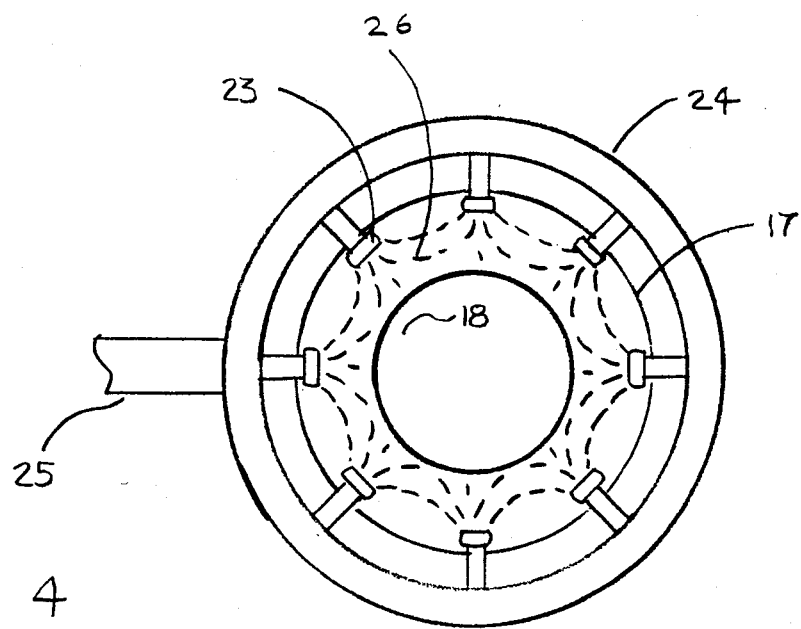
FIG. 4 is a cross section of FIG. 3.

Referring initially to FIGS. 1 and 2, there is provided a depiction of general essentials of a high energy embodiment incorporating the principles of this invention in the form of a modified venturi scrubber. As there shown, the modified venturi scrubber includes an entry section 1 of generally circular cross section into which a particulate bearing gas stream is introduced through a port or ports 2. Disposed downstream of entry section 1 is a restricted venturi section 3 within which the gas stream velocity is increased to at least 20 to 50 meters per second. At the downstream end of the venturi section 3 the gas stream expands and decelerates within an expanding diameter diffusion section 4 which recovers pressure head of the gas stream. Disposed downstream of the diffuser section 4 the gas exits the the conduit, as at 5 into a cyclone or other collector (not shown) which separates and collects the water droplets and the entrained particles, thus allowing a cleaned gas stream to leave the system.

Disposed at the throat 6 of the venturi section 3 are a plurality of circumferentially disposed nozzles 7 which spray water droplets 8 transversely into yhe throat of the venturi with said water droplets being thereafter accelerated in velocity downstream by the flowing gas stream. The nozzles are suitably fed from a pressurized water supply (not shown) through a pipe 9 via a manifold 10. While only four nozzles are here shown for clarity, several more may be required to provide the necessary throat coverage dependent upon the particulate loading of the gas stream or other relevant factors. As previously noted, the nozzles are preferrably of the flat fan type with the plane of atomization being disposed normal to the direction of flow of the gas stream as shown. However, as heretofore described, other types of nozzles may be utilized. Disposed in spaced relation and upstream of the nozzles 7 is a cylindrical charging electrode 11 with end 12 thereof being of spherical or rounded contour. The charging electrode 11 is axially and concentrically disposed relative to the venturi throat and closely adjacent to the plane of atomization of the nozzles 7 but in such position that the minimum cross sectional area for flow of the gas stream around the electrode is greater than the minimum cross section of the venturi throat 3. The charging electrode 11 is mounted on a convoluted insulating member 13 which isolates the electrode from the from the grounded conduit section 1 through which it passes. The charging electrode 11 is maintained at high voltage, typically between 20 and 100 kilovolts but oftentimes permissively higher, through conductor 14 connected to one pole of a high voltage DC power supply 15. The other pole of the power supply 15, the walls of the scrubber conduit and the water supply manifold 10 are all grounded. While the charging electrode 11 may be connected to either the positive or negative pole of the power supply 15, if the gas entrained particles are known to be of predominantly one polarity, then the charging electrode 11 should be connected to a similar polarity on the power supply 15 thereby inducing the opposite polarity on the water droplets and further enhancing the collection processes in the manner earlier mentioned. It should be noted that all sections of the charging electrode 11 and adjacent walls of conduit 1 should be of large radius of curvature with all sharp edges and projections eliminated so as to inhibit the onset of corona discharge. As more fully described hereinafter, the charge induced on the water droplets by the electric field surrounding electrode 11, effectively enhances the collection processes under the conditions extant in the venturi section 3 of the conduit. It should also be here noted that since no charge on the water droplets is carried downstream with those droplets, that no electrical current flows to the electrode 11 from ground and consequently zero power is drawn from the high voltage power supply 15.

Referring now to FIGS. 3, 4 and 5 there are illustrated exemplary elements incorporated in the second or low energy embodiment incorporating the principles of this invention. As there shown, the gas stream enters the scrubber tower through port or ports 16 at the base of an outer grounded cylindrical conducting tower 17, and passes upward through the annulus formed between the outer conducting cylinder 17 and a second inner and electrically isolated concentric conducting cylinder 18 suitably suspended from the outer cylinder 17 by one or more convoluted insulating members 19. The inner conducting cylinder is maintaineed at high DC potential, typically between 20 and 100 kilovolts, but sometimes higher, by connection through conductor 20 to one pole of an external DC high voltage power supply 21. The cleaned gas stream exits at the top of the tower through port 22. Disposed in circumferential and vertical spaced relation on the inner wall of the outer conducting cylinder 17 are a plurality of spray nozzles 23 fed through multiple manifolds 24 from a remote pressurized source of water (not shown) via a connecting pipe 25. FIGS. 3 and 4 depict an array of forty discreet spray nozzles for clarity, but such number may vary with the extingencies of the environment. Such nozzles 23 are again preferably flat fan pattern nozzles with the plane of atomization disposed normal to the direction of flow of the gas stream in the annulus, but hollow cone nozzles or other atomizing means capable of producing discreet particles of desired size as heretofore described may also be utilized. the spray of selectively sized water droplets 26 is charged inductively by the electric field extant between the grounded nozzles 23 and the high potential inner conducting cylinder 18. The induced charge on the spray particles is opposite in polarity to that of the charge on the inner cylinder 18 so that the sprayed water droplets are caused to traverse the annulus in essentially a horizontal radially inward direction toward and to the central electrode 18 at high velocity. The magnitude of such transverse spray velocity will be proportional to the magnitude of the electric field between the two concentric cylinders, the magnitude of electric charge carried by the water droplets and the initial velocity of such droplets at the locus of spray emission. The center cylinder can be either positively or negatively charged, however, if the entrained particles are known to be predominantly of one polarity then a charge of opposite polarity should be induced on the water droplets to further enhance the collection processes.

Figure 5:
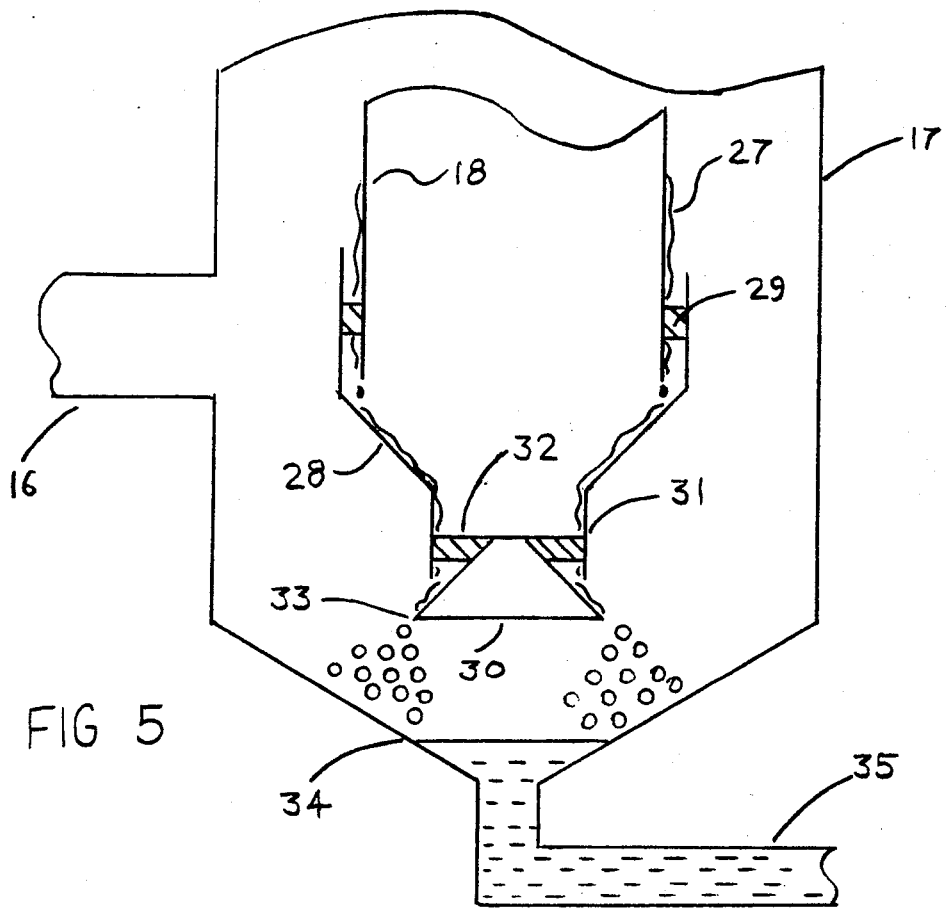
FIG. 5 is a schematic side elevational view of suitable means for providing discharge of effluent water to a grounded reservoir for use in apparatus of the general type shown in FIG. 3.

The presently preferred mechanism for effecting removal of the collected water droplets is shown on an enlarged scale and in greater detail in FIG. 5.

The vertical velocity of the gas stream within the annulus is typically low, desirably between 1 and 5 meters per second, so as to minimize pressure drop since, in this low energy embodiment, high relative velocity between the charged water droplets and the entrained particles to be collected results primarily from the high velocity of water droplets traversing the annulus under the influence of the electric field.

As shown in FIG. 5, a liquid film 27 constituted by the collected water droplets together with the collected entrained particles, flows vertically downward on the outer surface of the electrically charged inner cylinder 18 under the influence of gravity. The water film 27 flows into a small annulus formed between the cylinder 18 and the upper end of a funnel 28 mounted on the lower extremity of the electrode cylinder 18 by a web of three or more connecting members 29. Such web 29 is of open construction to provide only small impedance to the downward flow of water. The water film 27 flows uniformly down the inner walls of the funnel 28 which may be suitably grooved or channeled to uniformly distribute the liquid as it flows onto the outer surface of an inverted conducting cone 30 mounted concentrically within the discharge conduit 31 of the funnel by a second set of three or more webs 32. The dependent end of the inverted cone 30 is sized to extend significantly beyond the perimeter of the funnel discharge conduit section 31 and, being of relatively small diameter and of the same high electrical potential as the central electrode cylinder 18 produces a strong electric field at its lower perimetric extremity 33. The water film flowing on the outer surface of the inverted cone 30 is broken up into discrete droplets by electrohydrodynamic action resulting from the strong electric fields extant at the lower cone extremity, and such discrete droplets are attracted to the lower inner wall of the outer grounded conductor 17 to there accumulate in the funnel section 34 formed at the dependent end of the outer cylinder prior to being discharged through conduit 35 at ground potential.

As will now be apparent from the foregoing, all water conduits and supplies are maintained at ground potential and in addition all electrodes or other high voltage elements are totally and safely enclosed in grounded enclosures.

As pointed out earlier in this specification, the methods and apparatus herein disclosed employ dielectrophoretic forces to significantly enhance collection efficiencies. The operating parameters within which such dielectrophoretic phenomena can be effectively employed in both a high energy and a low energy environment are attended with some degree of criticality, largely due to the essentially antithetical effects of ceratin phenomena which inherently attend the use of electrostatic forces in a particulate enviroment.

By way of background, it has long been recognized that there is a theoretical limit to the amount of charge that a droplet may carry. Lord Rayleigh long ago demonstrated that a highly charged liquid droplet will disintegrate when the outward pressure produced by the repulsion of like charges exceeds the surface tension forces holding the droplet together and such charge limit, which is a function of diameter, is generally known as the Rayleigh limit. While the Rayleigh limit has been approached in experimentation in a low concentration droplet enviroment, available evidence indicates that such Rayleigh limit charging cannot even be closely approached in a droplet enviroment concentration that would permit practicable scrubber operation. Available evidence does appear to indicate, however, that it is feasible to charge water droplets in the 20 to 200 micron diameter range to about 20% of the Rayleigh limit and probably not significantly higher when such droplets are produced in sufficient quantities to make practicable the operation of a commercial charged droplet scrubber.

Figure 6:
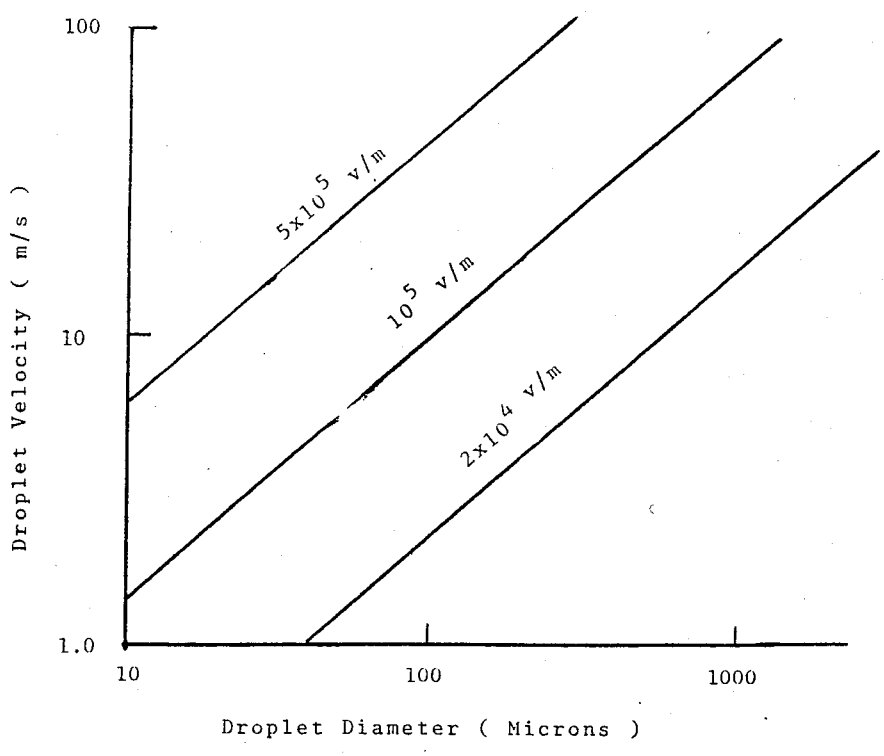
FIG. 6 is a logarithmic plot of droplet velocity relative to the gas stream under various electric fields for water droplets charged to 20% of the Rayleigh limit.

In consideration of such practical limitation, FIG. 6 shows the velocity which can practicably be attained by charged water droplets in various strength electric fields. For example, a 40 micron diameter droplet in a field of $3 \times 10^5$ volts per meter will traverse the gas flow at about 15 meters per second.

It has been established in an article by Stairmand titled 'Dust collection by impingement and diffusion' (Trans. I. Chem. E. 1950), that the collection efficiency per impact of an uncharged liquid droplet is related to the dimensionless number $Dg/Vf$, where D is the droplet diameter, g is gravitational acceleration, V is the velocity of approach of the droplet and particle and f is the free falling speed of the particle to be collected. The collection efficiency increases in a nonlinear, inverse manner to this dimensionless number and cosequently, it has been an inherent aim of most, if not all, prior art scrubber devices to achieve a ratio of D/V that is as small as possible. Unfortunately, in conventional prior practices and apparatus, these aims are generally mutually contradictory and permitted operation is the result of selective sacrifice of one of these parameters at the expense of the other or of a compromise between the two. For example, in a low energy spray tower collector, the attainment of a high value of V, in this case the terminal velocity of the water droplets, requires a large diameter D for the droplet. Similarly in a high energy venturi scrubber, where droplets are injected into a high velocity moving gas stream at the throat of the venturi, small diameter droplets accelerate much more quickly to the gas stream velocity than larger droplets resulting in a lower mean approach velocity for such smaller droplets and entrained particles. Similarly in prior art devices such as that disclosed by U.S. Pat. No.

3,958,959, it is seen from FIG. 6 that D and V increase together and, in fact, when compared to similar values attainable in conventional venturi scrubbers, would appear to yield inferior performance.

In the practice of this invention therefor, the use of considerably smaller droplets than heretofore considered, i.e. less than 60 microns, and preferrably in the range of 40 to 50 microns in diameter, considerably improves performance that may be attained compared to prior art devices by the permitted utilization of the forces of dielectrophoretic attraction.

Figure 7:
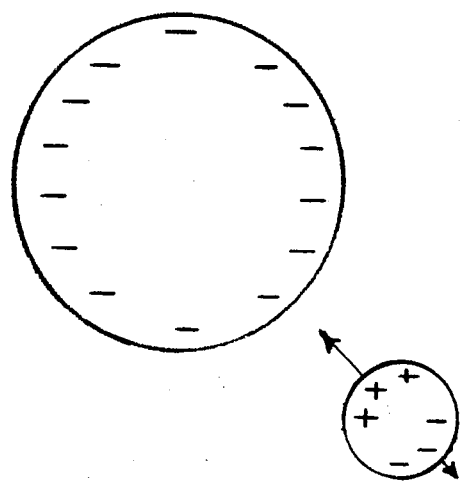
FIG. 7 is an enlarged schematic depiction of charge distribution which effects dielectrophoretic attraction between a charged droplet and an uncharged smaller particle.

The nature of such dielectrophoretic attraction is schematically depicted in FIG. 7 where the larger sphere represents a negatively charged water droplet in proximity to a smaller uncharged particle, which may be either solid or liquid and which has some small degree of electrical conductivity. The electric field around the larger droplet effects a selective attraction and separation of positive charge within the smaller particle and concommitment repulsion of negative charge, causing polarization of the smaller particle, as shown. Since the forces between charges are inversely proportional to the square of the distance between them, the attractive force between the negative charge on the water droplet and the closely spaced positive charge on the smaller droplet will be substantially higher than the repulsion force between the negative charge on the water droplet and the more widely spaced and remote negative charge on the smaller particle. A net attractive force will therefor exist between the water droplet and the smaller particle. Though little investigative attention has been devoted to this phenomenum, Pauthenier et al (C.R. Acad. Sci., Paris 231 213, 1950) and Cochet (C.R. Acad. Sci., Paris 233 190, 1951) showed that for a droplet carrying a charge of $1.3 \times 10^{-13}$ coulombs (which would be 20% of the Rayleigh limit for a 38 micron diameter droplet), that the collection efficiency increases for charged droplets below 100 microns diameter and increases substantially for charged droplets below 60 microns in diameter, especially when the collected particles are below 10 microns in diameter. This phenomenon was confirmed and later used by the applicant herein as a factor in a fog precipitation program by the Naval Weapons Center in China Lake, Calif. as reported by Carroz and Keller (NWC TP 5796, 1976).

Figure 8:
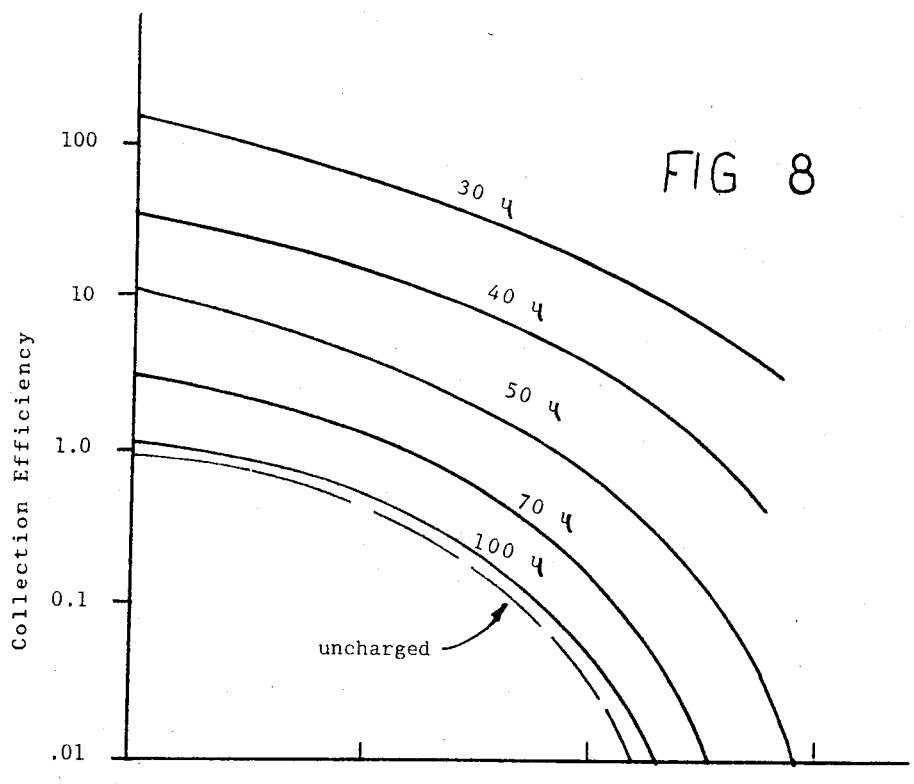
FIG. 8 is a logarithmic plot of collection efficiency per impact for uncharged particles and for charged particles of various diameters carrying $8 \times 10^5$ electron charges, versus the dimensionless number $Dg/Vf$.

FIG. 8 schematically shows the collection efficiency per impact of uncharged water droplets as derived by Stairmand and of charged water droplets derived from the data of Cochet, as a function of the dimensionless number Dg/Vf. It should be noted that in the case of charged droplets the collection efficiency increases with decrease in water droplet size for any given value of Dg/Vf. In the case of charged particles, efficiencies considerably greater than 1.0, which represents 100%, may arise, since paths which do not intersect geometrically will still result in collection due to the electrostatic forces. For uncharged droplets the illustrated efficiency of 1.0 or 100% represents the ideal case where the paths of the droplet and the collected particle intersect geometrically. Although collection efficiency continually increases as droplet size becomes smaller, the problems of atomization and space charge density and downstream collection of the droplets in the case of the high energy scrubber, operate to practicably preclude the use of very small water droplets. In the practice of the collection methods described herein, charged water droplets in the range about 30 microns at the lower end up to 60 microns are suitable and a size range between 40 and 50 microns is preferred.

It is likewise apparent from an examination of the characteristics of FIG. 8 that in a charged droplet scrubber of either the high energy or low energy type constructed in accordance with the principles disclosed herein, it is not necessary to employ very high relative velocities between droplets and particles to be collected to achieve highly efficient operation and collection.

As will be understood by those skilled in the art, other factors beside individual droplet impact collection efficiency affect the collection of particles in scrubbers of all types, most important of which is the area swept by the water droplets. The area swept, for a given volume flow of water, is proportional to the distance the droplet travels relative to the gas stream and is inversely proportional to the diameter of the water droplet or $$V/V_w = 3L/2D$$

where V is the volume of gas swept by the water droplets, $V_w$ is the volume of water, L is the mean path length of the water droplets and D is the droplet diameter.

In the case of conventional venturi scrubbers, the attainment of large values of L is incompatible with the use of small values of the droplet diameter D, as heretofore discussed. Of equal disadvantage, proposed prior art charged droplet scrubbers, which necessarily use similar quantities of water to conventional scrubbers are subject to severe size limitations resulting from the high space charges attendant high concentrations of highly charged droplets, and which largely negate electrostatic benefit and negatively impact the overall performance of the system.

In the practice of the herein disclosed method, in both the high energy and low energy embodiments, not only are large volumes of water not necessary but such use will impair overall efficiency of the system. For example, conventional venturi scrubbers typically operate with a water flow rate up to and occasionally exceeding a cubic meter of water for each 1000 cubic meters of particulate bearing gas being treated. A high energy or low energy type charged droplet scrubber of the type disclosed herein and exemplarily constructed and operated with hereinafter set forth operating parameters will yield equal or even better collection performance than a conventional venturi scrubber, while employing a water consumption that is on the order of one tenth this level. Furthermore, charged droplet scrubbers constructed according to the principles disclosed herein will perform well with duct velocities and pressure drops that are considerably lower than those conventionally employed in conventional venturi scrubbers. By way of example, suitable small charged droplet low energy and high energy scrubbers constructed in accordance with the principles of this invention illustratively operate in accord with the following parameters:

|  | Low energy | High energy |
| --- | --- | --- |
| Gas flow rate (m³/hr) | 6000 | 6000 |
| Water flow rate (m³/hr) | 0.6 | 0.6 |
| Water droplet size (microns) | 40 | 40 |
| Charge level (coulombs/kg) | $4 \times 10^{-3}$ | $4 \times 10^{-3}$ |
| Outer duct diameter (m) | 0.75 | — |
| Inner duct diameter (m) | 0.38 | — |

-continued

|  | Low energy | High energy |
|---|---|---|
| Throat diameter (m) |  | 0.23 |
| Gas flow velocity (m/s) | 5.0 | 40 |
| Pressure drop (mb) | 3.0 | 15.0 |
| Height (m) | 2.0 | — |
| Voltage (kv) | 60 | 60 |
| Current (microamps) | 670 | 0 |
| Electrical power (watts) | 40 | 0 |
| Droplet traverse velocity (m/s) | 15 | 40 |
| Charge density in duct (cb/m$^3$) | $1.2 \times 10^{-5}$ | $4 \times 10^{-4}$ |
| Efficiency (5 micron) (%) | 99.9 | 99.9 |
| Efficiency (2 micron) (%) | 99.0 | 99.0 |
| Efficiency (1 micron) (%) | 97.0 | 97.0 |
| Efficiency (0.1 micron) (%) | 12.0 | 12.0 |

As will now be apparent to those skilled in this art, the permitted usage of dielectrophoretically enhanced particle collection as disclosed and described herein, generally employs water droplets in a size range from 30 microns at the lower level up to about 60 microns, bearing a charge of less than one quarter of the Rayleigh limit and in a volume generally less than about one ten thousandth of the volume of gas to be cleaned in an environment of permitted lower pressure drops and in apparatus where all high potential bearing elements are safely enclosed within a grounded structure and where all water supply and discharge conduits are likewise at ground potential.

Having thus described my invention, I claim:

1. In the dielectrophoretically enhanced separation of small sized particles from a moving stream of gas, the steps of
    introducing a spray of discrete liquid droplets of 60 microns or less in diameter and having an electrical charge thereon greater than $10^{-3}$ coulombs per kilogram but not greater than 25 percent of the Rayleigh limit thereon, into said moving gas stream,
    selectively directing the locus of introduction of said spray of liquid droplets in a path relative to the path of advance of said gas stream to maximize geometric interdiction of said charged droplets and the entrained particles in said gas stream,
    and regulating the volume of liquid so introduced to be in the order of about one ten thousandth that of the volume of gas being treated per unit time to minimize space charge degradation of the collecting environment with attendant minimization of dielectrophoretic attraction forces therewithin.

2. The method as set forth in claim 1 wherein the droplets in said introduced spray of liquid droplets will have a diameter in the range of from 30 to 60 microns.

3. The method as set forth in claim 1 wherein the droplets in said introduced spray of liquid droplets will have a diameter in the range of 40 to 50 microns.

4. The method as set forth in claim 1 wherein the droplets in said introduced spray of liquid droplets will have an electrical charge thereon intermediate $10^{-2}$ and $10^{-3}$ coulombs per kilogram.

5. The method as set forth in claim 1 wherein the droplets in said introduced spray of liquid droplets contain a chemical agent to react with at least one gaseous component in said moving gas stream.

6. Apparatus for effecting dielectrophoretically enhanced separation of small sized particulates from a moving gas stream comprising
    conduit means for confining said moving gas stream bearing said particles,
    means for introducing a spray of selectively sized and charged liquid droplets into said gas stream in a path relative to the advance of said gas stream to maximize geometric interdiction of said charged droplets and the entrained particles in said gas stream,
    means associated with said spray introduction means for limiting the size of said introduced liquid droplets to 60 microns or less in diameter,
    means for applying an electrical charge of greater than $10^{-3}$ coulombs per kilogram to said emitted spray droplets, such charge not being greater than 25 percent of the Rayleigh limit therefore,
    said means for regulating the volume of liquid so introduced in droplet form to be in the order of about one ten thousandth that of the volume of gas being treated per unit time to minimize space charge degradation of the collecting environment with attendant minimization of dielectrophoretic attraction forces therewithin.

7. Apparatus as set forth in claim 6 wherein the diameter of said charged droplets is maintained between 30 and 60 microns.

8. Apparatus as set forth in claim 6 wherein the diameter of said charged droplets is maintained between 40 and 50 microns.

9. Apparatus as set forth in claim 6 wherein the droplets introduced in said spray will have an electrical charge thereon intermediate $10^{-2}$ and $10^{-3}$ coulombs per kilogram.

10. Apparatus as set forth in claim 6 wherein said conduit means is in the form of an annulus defined by a cylindrical high voltage electrode element surrounded by a grounded shell, and through which the moving gas stream is directed,
    and said spray introduction means selectively directs said emitted droplets from said outer shell to said cylindrical electrode element substantially transversely to the path of advance of said gas stream.

11. Apparatus as set forth in claim 10 wherein the dependent terminal end of said cylindrical electrode element is in the form of a downwardly and outwardly expanding truncated cone the dependent perimetric edge of which electrohydrodynamically disrupts any liquid film flowing therepast into dicrete droplets prior to passage to a collection basin diposed at ground potential.

12. Apparatus as set forth in claim 10 wherein said spray introduction means is mounted on said grounded shell and is also maintained at ground potential and
    wherein said liquid supply and liquid removal means are maintained at ground potential.

13. Apparatus as set forth in claim 6 wherein said conduit means is in the form of a duct having a venturi like restriction therein and through which the gas stream is accelerated,
    said spray introduction means being positioned to selectively direct said emitted droplets transversely across the path of said gas stream at the restriction therein,
    and said means for applying the electrical charge comprising high voltage electrode means disposed coaxially with said restriction and in spaced relation upstream thereof.

14. Apparatus as set forth in claim 13 wherein said high voltage electrode means and said duct form an annulus whose cross sectional area for gas flow therethrough is greater than the cross sectional area at the venturi like restriction in the duct.

15. Apparatus as set forth in claim 14 wherein the downstream end of said electrode element means and the conduit walls intermediate said electrode means and said restriction are of smoothly curved configuration.

* * * * *